(12) United States Patent
Xing et al.

(10) Patent No.: US 8,751,515 B1
(45) Date of Patent: Jun. 10, 2014

(54) SYSTEM AND METHOD FOR FILE-BASED VIRTUAL MACHINE INCREMENTAL BACKUP

(75) Inventors: Jian Xing, Pleasanton, CA (US); Anand Raj, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/436,460

(22) Filed: Mar. 30, 2012

(51) Int. Cl.
*G06F 7/00* (2006.01)

(52) U.S. Cl.
USPC ......................................................... 707/755

(58) Field of Classification Search
USPC ......................................................... 707/755
See application file for complete search history.

(56) References Cited

U.S. PATENT DOCUMENTS

| | | | |
|---|---|---|---|
| 6,313,662 B1 | 11/2001 | Ide | |
| 8,046,550 B2 | 10/2011 | Feathergill | |
| 8,326,803 B1 * | 12/2012 | Stringham | 707/652 |
| 2007/0244938 A1 | 10/2007 | Michael et al. | |
| 2010/0049930 A1 | 2/2010 | Pershin et al. | |
| 2010/0138827 A1 * | 6/2010 | Frank et al. | 718/1 |
| 2012/0158806 A1 | 6/2012 | Snyder et al. | |
| 2012/0323853 A1 * | 12/2012 | Fries et al. | 707/649 |

OTHER PUBLICATIONS

United States Office Action dated May 3, 2012 in U.S. Appl. No. 10/853,654.
Non-Final Office Action, U.S. Appl. No. 13/436,454, dated May 3, 2013, 12 pages.
Final Office Action, U.S. Appl. No. 13/436,454, dated Aug. 9, 2013, 13 pages.
International Search Report and Written Opinion mailed Jan. 2, 2014, for International Application No. PCT/US2013/061478, 11 pages.

* cited by examiner

*Primary Examiner* — Truong Vo
(74) *Attorney, Agent, or Firm* — Blakely Sokoloff Taylor & Zafman LLP

(57) ABSTRACT

A source virtual machine (VM) disk file associated with a VM is parsed to generate metadata representing files stored in a virtual storage device of the VM, where the VM is one of VMs hosted by a VM monitor (VMM). In response to a request for an incremental backup of files stored in the source VM disk file, a file attribute of each of the files is examined based on the metadata to identify one or more files that have been modified within a predetermined past period of time. File records associated with the identified files are determined based on the metadata that have been modified within the predetermined past period of time. The identified file records are then backed up from the source VM disk file to a target VM disk file, without having to back up unmodified files in the source VM disk file.

21 Claims, 11 Drawing Sheets

```
struct stat {
    dev_t       st_dev;       /* device */
    ino_t       st_ino;       /* inode */
    mode_t      st_mode;      /* protection */
    nlink_t     st_nlink;     /* number of hard links */
    uid_t       st_uid;       /* user ID of owner */
    gid_t       st_gid;       /* group ID of owner */
    dev_t       st_rdev;      /* device type (if inode device) */
    off_t       st_size;      /* total size, in bytes */
    blksize_t   st_blksize;   /* blocksize for filesystem I/O */
    blkcnt_t    st_blocks;    /* number of blocks allocated */
    time_t      st_atime;     /* time of last access */
    time_t      st_mtime;     /* time of last modification */
    time_t      st_ctime;     /* time of last status change */
};
```

FIG. 8

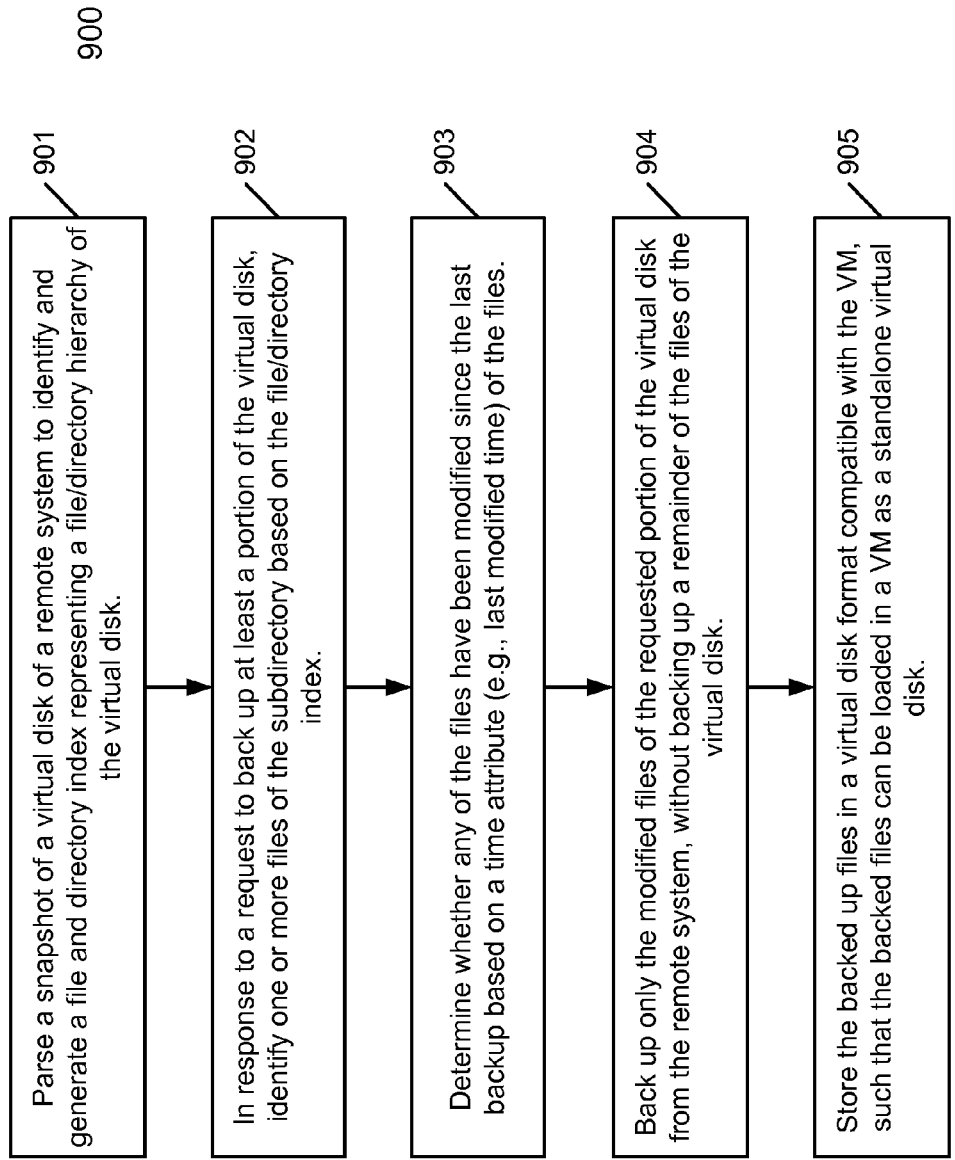

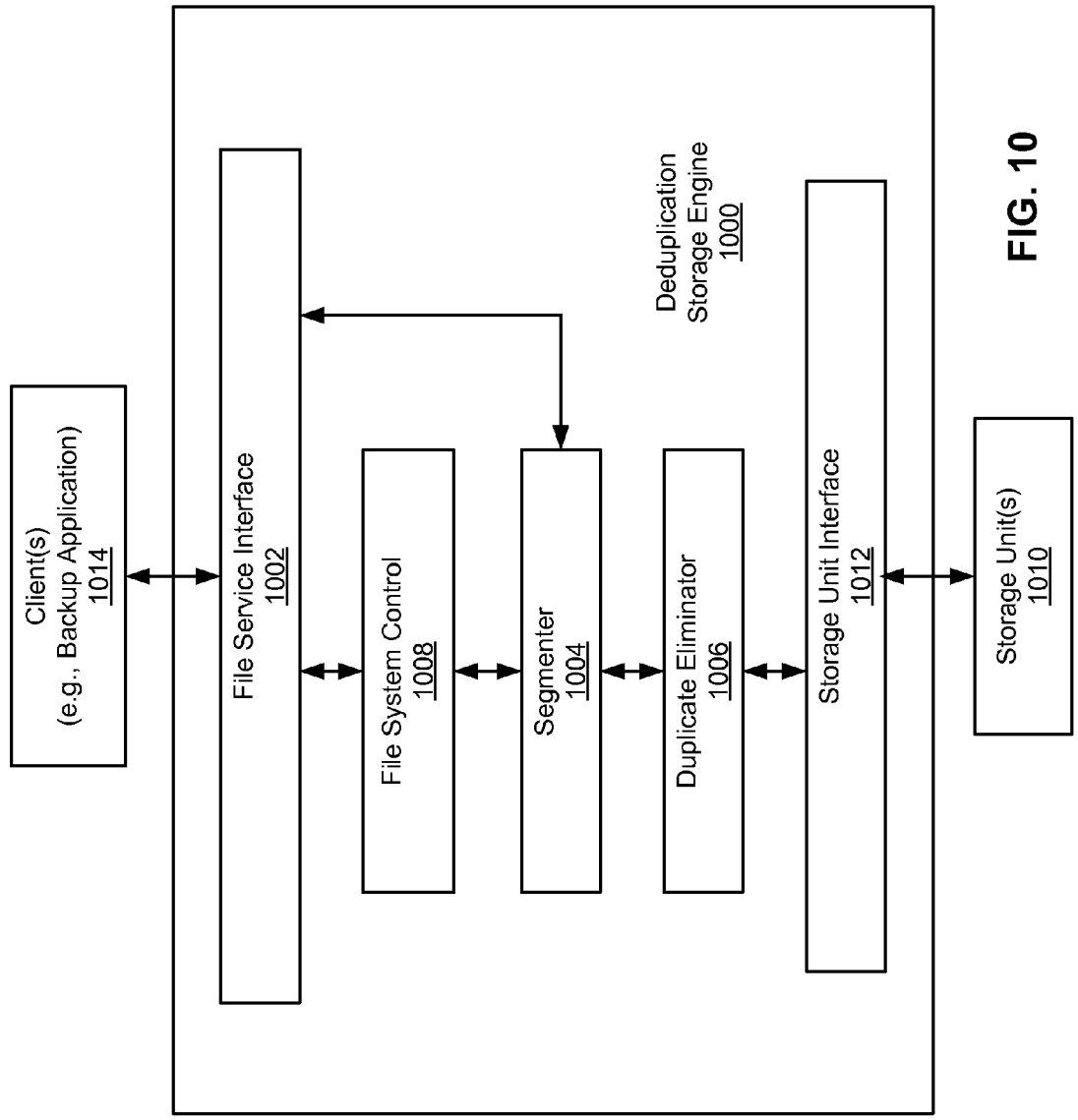

SYSTEM AND METHOD FOR FILE-BASED VIRTUAL MACHINE INCREMENTAL BACKUP

RELATED APPLICATIONS

This application is related to co-pending U.S. patent application Ser. No. 13/436,454 entitled "System and Method for Block-Based Subtree Virtual Machine Backup," filed Mar. 30, 2012, which is incorporated by reference herein in its entirety.

FIELD OF THE INVENTION

Embodiments of the present invention relate generally to data storage systems. More particularly, embodiments of the invention relate to virtual machine (VM) incremental backup.

BACKGROUND

Subtree backup is a common practice to protect user data since not all files in a computer system are equally important to a user. For example, a user might not want to back up the operating system (OS) image file, program cache, status file, etc. For a physical machine, a user can install a backup agent to achieve subtree backup easily. However, in a virtual environment, it is not possible or practical to install a backup agent in all virtual machines (VMs). Currently, a conventional VM backup solution requires mounting the VM to a proxy server for subtree backup and such a solution is inconvenient and inflexible.

A VM can be protected in multiple ways (e.g., an image level backup and a file level backup). One of the disadvantages of protecting a virtual disk file as a single file is that each backup requires the same size as the virtual disk (even if only minimal changes are present in the VM between backups). The recovery of files from such a backup requires additional and complex operations to mount the virtual disk as a guest file system using a third party tool and an ability to determine/recover only the specific types of files. Another disadvantage of a conventional subtree backup requires either deploying a backup agent in every VM or mounting the VM to a proxy server. Complexity of deployment depends on the size of the virtualization environment.

A file is a basic unit which an end user wants to protect for both physical and virtual machines. Currently, there are a variety of different methods to protect files in a virtual environment and each method has its advantages and disadvantages. For example, a backup agent can be installed in a VM like a physical machine. This solution is the simplest method since it does not require any new design from backup software. However, such a solution does not scale well in a virtual environment.

Virtualization vendors such as VMware provide a set of application programming interface (API) (e.g., VADP) for a backup application to mount a VM file system to a remote host. In this situation, the backup application mounts a VM to a proxy server and performs a file level backup on the mounted file system. On incremental backup, the backup software walks the file system and finds which of the files that has been changed. However, walking the file system is slow and it is also inconvenient to mount a VM in a proxy server.

Another conventional method uses a changed block tracking (CBT) feature provided by a virtual machine monitor (VMM) to keep track of data blocks changed. Under this approach, backup application does not need to mount the VM to a proxy server. Typically, it will pre-parse a virtual disk file to generate file index and use a VM backup API, such as VDDK available from VMware, to read the virtual disk file from the VMM and send data to backup target storage. For incremental backup, the CBT is used to generate a list of changed blocks between two snapshots and only the changed blocks will be backed up. This approach backs up only the changed blocks between backups and as a result, it is very likely that a partial file will be backed up on incremental backup. A user will need to read from multiple backups in order to recover a full file. If the backup target is traditional media such as tape, the recovery process could be very slow and costly. Furthermore, not all virtualization vendors provide the feature of CBT, which limit the effective usage of this approach. Often, the entire virtual disk file has to be backed up.

BRIEF DESCRIPTION OF THE DRAWINGS

Embodiments of the invention are illustrated by way of example and not limitation in the figures of the accompanying drawings in which like references indicate similar elements.

FIG. 8 is a block diagram illustrating an inode of a file.

FIG. 9 is a flow diagram illustrating a method for incremental VM backup according to one embodiment of the invention.

FIG. 10 is a block diagram illustrating a deduplicated storage system according to one embodiment of the invention.

DETAILED DESCRIPTION

Figure 1:
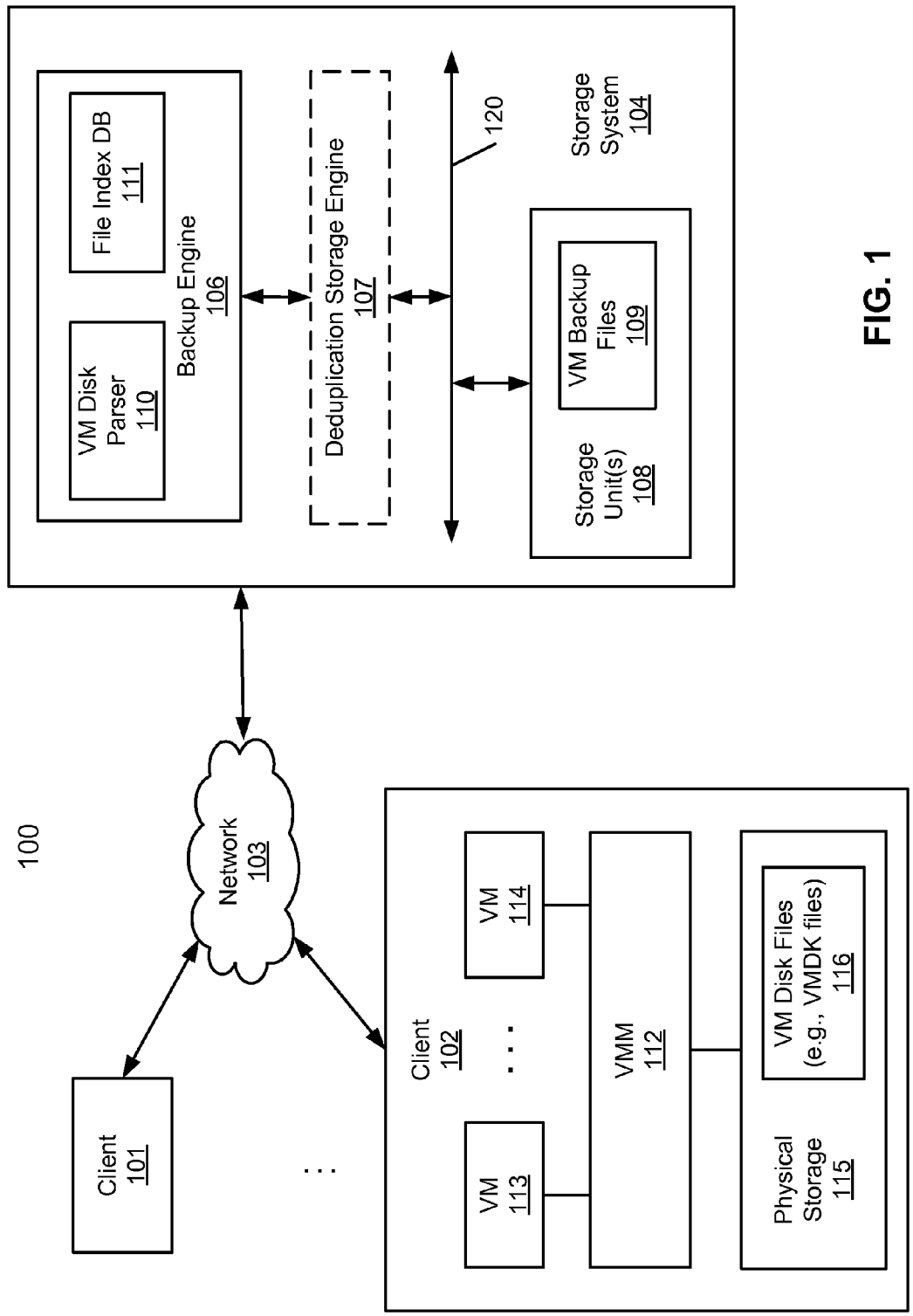
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a virtual disk file of a VM, referred to herein as a VM disk file, is parsed to generate metadata describing content files stored in a virtual storage device of the VM. In one embodiment, a backup engine of a storage system accesses the VM disk file of a data processing system hosting one or more VMs, where each VM corresponds to a virtual disk file storing content files of a virtual storage device of the respective VM. In one embodiment, the backup engine of a storage system such as a backup server may remotely (e.g., over a network such as the Internet) access the virtual disk file via an API of a VM monitor (VMM), also referred to as a VM manager or a hypervisor, to parse the virtual disk file to generate metadata representing the content files contained in the virtual disk file. In one embodiment, the backup engine communicates with the VMM to cause the VMM to generate a snapshot of the virtual disk file and to generate the metadata based on the snapshot of the virtual disk file, without having to mount the virtual disk file, for example, in a proxy server.

In one embodiment, the metadata is utilized to generate a file index database that can be queried subsequently for backup purposes. The file index database can be implemented in a variety of formats or architectures. In one embodiment, the file index database includes many entries, each entry corresponding to a file stored in a particular directory of the corresponding virtual disk file, also referred to herein as a source virtual disk file, and storing metadata associated with the respective file. Metadata of a file may include information that can identify the file from the source virtual disk file, such as a file system record identifier (ID) identifying a file system record of the file compatible with a file system of the source virtual disk file, current and/or parent directory information of the file, and at least some file attributes of the file (e.g., at least some information from an inode of the file). The file index database may further include information describing the corresponding virtual disk file, such as virtual disk file header information or information associated with the corresponding VM, such that the source virtual disk file can be recreated based on information stored in the file index database.

The file index database can be utilized to back up data from the source virtual disk file, either a full backup or a partial backup, at a variety of granularity levels (e.g., block and/or file granularity level). In one embodiment, in response to a request to back up a subdirectory (also referred to as a subtree) of one or more files, the backup engine accesses the file index database based on an identifier (e.g., directory name) of the requested subdirectory obtained from the request to identify a file system record or records associated with the requested subdirectory. Data blocks corresponding to the identified file system records are then backed up from the source virtual disk file of the remote data processing system without having to back up the remaining data of the source virtual disk file. This can be considered as a full backup of a subdirectory, also referred to as a block-based subtree backup.

According to one embodiment, the file index database of a virtual disk can also be utilized for incremental backup at a file granularity level. In one embodiment, based on the metadata of the files maintained by the file index database, certain files can be identified that satisfy an incremental backup policy and thus, are backed up from a source virtual disk to target storage, without having to back up remaining files. For example, based on the metadata stored in the file index database, files that have been accessed (e.g., modified) within a predetermined period of time in the past (e.g., since last backup) or certain types of files (e.g., *.doc, *.pdf) can be backed up from source storage to target storage, while the files that have not been accessed or other types of files will not be backed up (since such files probably have been backed up in a previous backup). Such files can be identified based on one or more file attributes, such as a time attribute or file extensions, of the files. This is referred to herein as a file-based incremental backup because the backup is performed on a per file basis. In one embodiment, a combination of a block-based subtree backup and a file-based incremental backup can be utilized, for example, for an incremental backup of a subdirectory.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a de-duplication storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple segments according to a variety of segmentation policies or rules. Deduplication storage engine 107 only stores a segment in a storage unit if the segment has not been previously stored in the storage unit. In the event that a segment has been previously stored, metadata stores information enabling the reconstruction of a file using the previously stored segment. As a result, segments of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

The metadata may be stored in at least some of storage units 108-109, such that files can be accessed independent of another storage unit. Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the segments associated with the file name are stored, reconstruction information for the file using the segments, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, backup engine 106 is configured to backup data from client systems 101-102 and to store the backed up data in one or more of storage units 108, which may be deduplicated by deduplication storage engine 107. In one embodiment, backup engine 106 can back up data from a client system that is stored in a virtual operating environment such as a VM provided by a variety of VM vendors such as VMware. The data can be backed up without having to install a backup agent within the corresponding VM and/or without having to mount the corresponding VM disk on a proxy server. Further, instead of backing up the entire VM disk, a portion or subdirectory of the VM disk can be backed up.

In this example, client 102 includes one or more VMs 113-114 hosted by VM monitor or manager (VMM) 112. Data of each of VMs 113-114 is stored in one of VM disk files 116 in physical storage 115 representing a virtual storage device of the associated VM. Data stored in VM disk files may be optionally deduplicated by deduplication storage engine 107.

A virtual machine represents a completely isolated operating environment with a dedicated set of resources associated with. A virtual machine may be installed or launched as a guest operating system (OS) hosted by a host OS. Typically, a host OS represents a virtual machine monitor (VMM) (also referred to as a hypervisor) for managing the hosted virtual machines. A virtual machine can be any type of virtual machines, such as, for example, hardware emulation, full virtualization, para-virtualization, and operating system-level virtualization virtual machines. Different virtual machines hosted by a server may have the same or different privilege levels for accessing different resources.

According to one embodiment, backup engine 106 includes VM disk parser 110 to parse a virtual disk file of a VM (e.g., virtual disk files 116 of VMs 113-114) to generate metadata describing content files of stored in a virtual storage device of the VM. In one embodiment, backup engine 106 of storage system 104 accesses the VM disk file of a data processing system such as client system 102 hosting one or more VMs, where each VM corresponds to a virtual disk file storing content files of a virtual storage device of the respective VM. In one embodiment, VM disk parser 110 of backup engine 106 remotely accesses over network 103 virtual disk file 116 via an API of VMM 112 to parse virtual disk file 116 to generate metadata representing the content files contained in the virtual disk file. In one embodiment, VM disk parser 110 of backup engine 106 communicates with the VMM 112 to cause the VMM 112 to generate a snapshot of the virtual disk file 116 and to generate the metadata based on the snapshot of the virtual disk file, without having to mount the virtual disk file, for example, in a proxy server.

In one embodiment, the metadata is utilized to generate a file index database 111 that can be queried subsequently for backup purposes. The file index database 111 can be implemented in a variety of formats or architectures. In one embodiment, the file index database 111 includes many entries, each entry corresponding to a file stored in a particular directory of the corresponding virtual disk file 116, also referred to herein as a source virtual disk file, and storing metadata associated with the respective file. Metadata of a file may include information that can identify the file from the source virtual disk file, such as a file system record identifier (ID) identifying a file system record of the file compatible with a file system of the source virtual disk file, current and/or parent directory information of the file, and at least some file attributes of the file (e.g., at least some information from an inode of the file). The file index database 111 may further include information describing the corresponding virtual disk file, such as virtual disk file header information or information associated with the corresponding VM, such that the source virtual disk file can be recreated based on information stored in the file index database.

The file index database 111 can be utilized to back up data from a source virtual disk file, either a full backup or a partial backup, at a variety of granularity levels (e.g., block and/or file granularity level). In one embodiment, in response to a request to back up a subdirectory (also referred to as a subtree) of one or more files of a VM, VM disk parser 110 of backup engine 106 accesses the file index database 111 based on an identifier (e.g., directory name) of the requested subdirectory obtained from the request to identify a file system record or records associated with the requested subdirectory. Backup engine 106 transmits the file system record identifying information to VMM 112 to retrieve the data blocks corresponding to the file system records. Data blocks corresponding to the identified file system records are then backed up from the source virtual disk file of the remote data processing system without having to back up the remaining data of the source virtual disk file. The data blocks may further be deduplicated by deduplication storage engine 107 before being stored in storage units 108. This can be considered as a full backup of a subdirectory, also referred to as a block-based subtree backup.

In one embodiment, deduplication storage engine 107 at the server may be utilized to back up only segments of a file or directory that have not been backed up since the last backup operation to reduce the storage space and/or the network bandwidth required for transferring the data blocks. According to one embodiment, when backing up the full virtual disk file, before the data is moved from the host to the storage, a FastCopy operation is performed which will create a copy of the original file without create any new data in a de-duplicated system. The new segments will then overwrite the old-segments in the new created copy of a virtual disk file. As a result, there are two copies of the virtual disk file and each of them can be used for recovery. For a sub-tree backup, according to one embodiment, the header of the virtual disk file and OS metadata file in guest OS are copied, and the backup is maintained in a virtual disk format which enable the virtual disk file to be added back to a running VM.

According to one embodiment, the file index database 111 of a virtual disk can also be utilized for incremental backup at a file granularity level. In one embodiment, based on the metadata of the files maintained by the file index database 111, certain files can be identified that satisfy an incremental backup policy and thus, are backed up from a source virtual disk to target storage (e.g., storage units 108), without having to back up remaining files. For example, based on the metadata stored in the file index database 111, files that have been accessed (e.g., modified) within a predetermined period of time in the past (e.g., since last backup) can be backed up from source storage to target storage, while the files that have not been accessed will not be backed up (since such files probably have been backed up in a previous backup). Such files can be identified based on one or more file attributes, such as a time attribute, of the files. Alternatively, certain types of files (e.g., *.doc, *.pdf) can be backed up or skipped for backup based on the file attributes. This is referred to herein as a file-based incremental backup. In one embodiment, a combination of a block-based subtree backup and a file-based incremental backup can be utilized, for example, for an incremental backup of a subdirectory. Furthermore, according to one embodiment, the incremental backup can also be performed at a data object granularity level, where a data object or objects may be identified within a file or subdirectory that have not been backed up since the last backup operation based on the metadata. Such data objects may be identified by invoking deduplication storage engine 107 to identify the deduplicated data objects and only those deduplicated data objects will be backed up. For example, the corresponding file records associated with the deduplicated data objects may be identified based on the metadata and only the data blocks associated with those file records are backed up.

Figure 2:
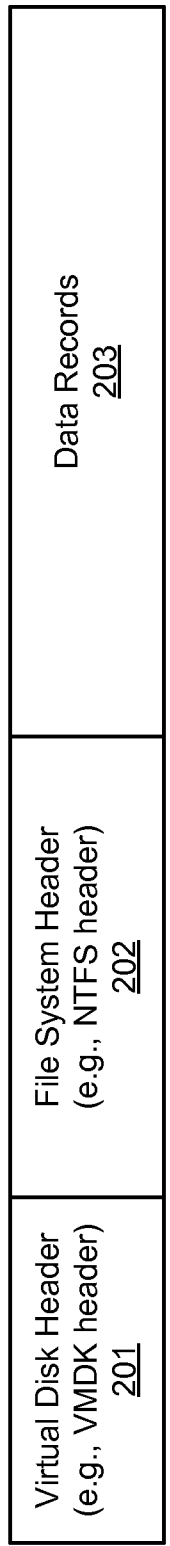
FIG. 2 is a block diagram illustrating an example of a virtual disk file.

FIG. 2 is a block diagram illustrating an example of a virtual disk file. VM disk file 200 can represent any of VM disk files 116 of FIG. 1. Referring to FIG. 2, VM disk file 200 includes VM disk header 201, file system header 202, and data records 203. The format of VM disk header 201 may vary dependent upon the specific VM vendors. For example, VM disk header 201 may be compatible with a header format of a virtual machine disk (VMDK) header provided by VMware. Similarly, the format of file system header 202 may vary dependent upon the types of file systems used by the VMs. A file system can be a variety of files systems, such as an NTFS (new technology file system) file system.

Figure 3:
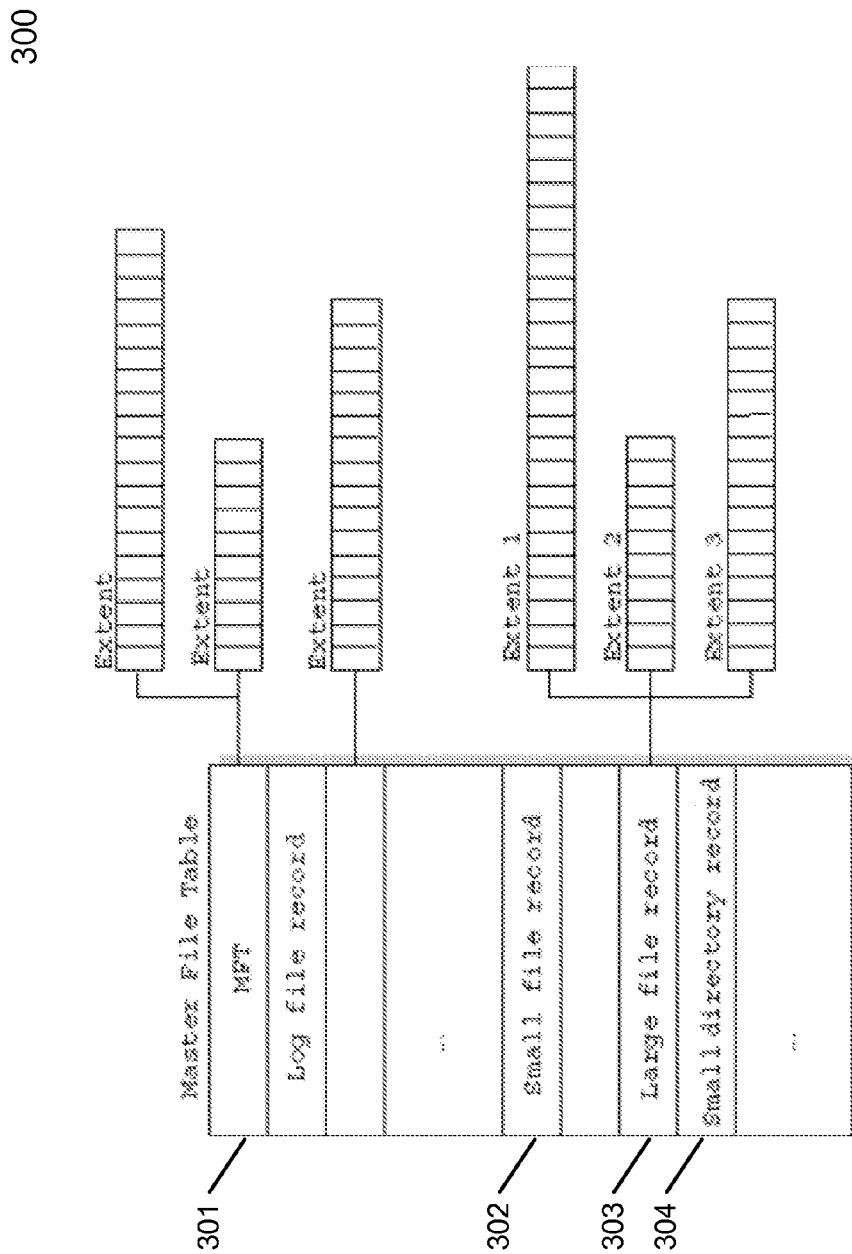
FIG. 3 is a block diagram illustrating an example of an NTFS file system.

FIG. 3 is a block diagram illustrating an example of an NTFS file system. NTFS 300 may represent file system header 202 and data records 203 of FIG. 2. In the NTFS file system, each file on an NTFS volume is represented by a record in a special file called master file table (MFT). Referring to FIG. 3, NTFS file system 300 includes a master file table (MFT) 301 and one or more MFT records 302-304, where the files and/or directories are stored as MFT records. The MFT table allocates a certain amount of space for each file record. The attributes of a file are written to the allocated space in the MFT. Small files and directories can entirely be contained within the same MFT record. Directory records are housed within the MFT table just like file records. Instead of data, directories contain index information. Small directory records reside entirely within the MFT structure. Large directories are organized into B-trees, having records with pointers to external clusters (referred to as extents) containing directory entries that could not be contained within the MFT structure.

According to one embodiment, VM disk parser 110 of backup engine 106 of FIG. 1 is configured to parse VM disk file 200 to extract metadata representing files stored in VM disk 200 and store the metadata in a file index database 111. File index database 111 may include entries, each entry corresponding to a file or a directory stored in VM files 116. Each entry includes a file identifier (e.g., file/directory name), an MFT record corresponding to the file, and metadata of the file (e.g., file attributes such as inode information as shown in FIG. 8). In addition, file parent name, file name, size, create time, modified time, access time, owner, group owner, access permission for owner, group and other, etc. can also be maintained as part of the metadata. File index database 111 can be subsequently queried to back up a subdirectory of files without having to back up the entire VM disk. File index database 111 can also be used for incremental backup on a file-to-file basis based on the metadata, from a source VM disk file to a target VM disk file. The target disk file can be loaded in a VM as a standalone VM disk file. Throughout this application, a VMDK file is utilized as an example of a virtual disk file and the NTFS is utilized as an example of a file system. However, it is not so limited; other formats of virtual disk files and/or file systems can also be applied.

Figure 4:
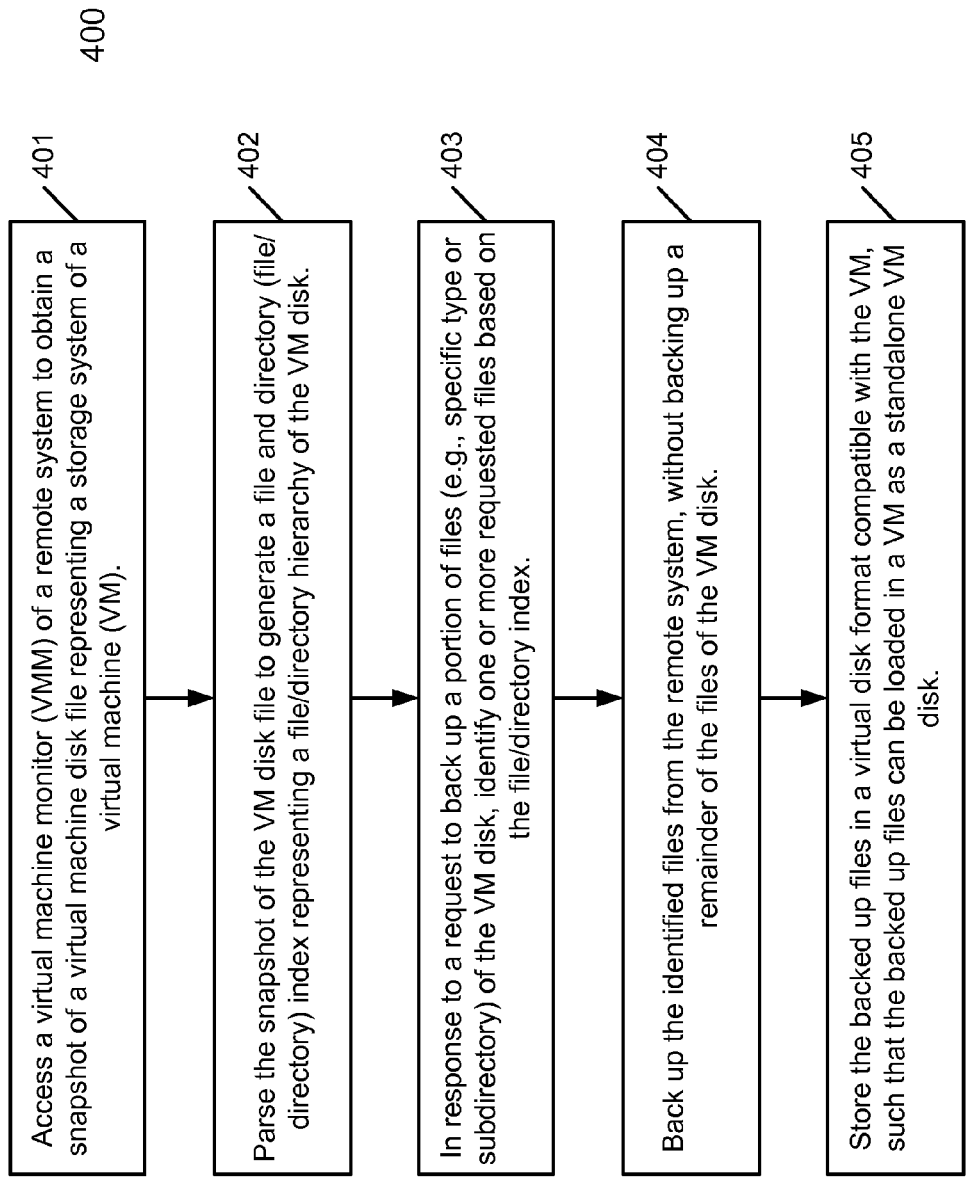
FIG. 4 is a flow diagram illustrating a method for obfuscating source code according to one embodiment of the invention.

FIG. 4 is a flow diagram illustrating a method for obfuscating source code according to one embodiment of the invention. Method 400 may be performed by backup engine 106 of FIG. 1, which may be implemented as processing logic in software, hardware, or a combination thereof. Referring to FIG. 4, at block 401, processing logic accesses a VMM of a remote system to obtain a snapshot of a VM disk representing a storage system of a VM. Processing logic can access the VMM via an API of the VMM over a network, without having to install a backup agent within the VMM or the VM, or to mount the VM in a proxy server. At block 402, processing logic parses the snapshot of the VM disk file to extract metadata to generate a file and directory index representing a file/directory hierarchy of the VM disk. At block 403, in response to a request to back up a portion of files of the VM disk file (e.g., a specific type of files or a subdirectory of files), processing logic identifies one or more requested files based on the file/directory index. At block 404, the identified files/directories are backed up from the VM disk file of the remote system without backing up the remaining files of the VM disk file. At block 405, the backed up files are then stored in a target VM disk file that is compatible with the VM, such that the target VM disk file can be loaded in a VM as a standalone VM disk, for example, without the remaining files in the original source VM disk.

As described above, embodiments of the invention provide an efficient backup solution to a virtual operating environment, such as file-level granular operations and sub-tree backup operations: 1) parsing a virtual disk file (e.g., VMDK file) to extract file information; 2) maintaining a virtual disk format for sub-tree backup (e.g., keeping a copy of the header of a virtual disk file and/or NTFS header information); and 3) modifying file system information to keep file system consistent (e.g., bit map file, parent directory of sub-tree).

According to one embodiment, the backup engine parses a virtual disk file to extract metadata before backup and based on the metadata, generates indexes about the files/directories present in the file system of the virtual disk. The metadata (e.g., indexes) thus generated are stored in a database such as file index database 111. The metadata can be queried to obtain information that will be required to perform file-level granular operations.

In one embodiment, metadata of a file contains information on files and directories in the source virtual disk such as file system record identifier (ID) (e.g., MFT record ID), file/directory name, absolute directory path, time stamps, file size, file type, and file system record type (e.g., resident, non-resident, directory, or content file). To perform any file-level granular operation, the database can be queried to obtain the required information. In order to achieve any file-level granular operation, the database is leveraged to obtain information regarding the file or directory in question. The information (especially the file system record ID) thus obtained can be used to obtain the corresponding file system record details from the database. The file system record details contain the file block information of the file to be backed up. The file system record detailed information is used to identify one or more sub-directories, files, and the corresponding file blocks. Using the file block information, data can be extracted from the source virtual disk file and written to a target virtual disk file. The file system record blocks for the corresponding directory, subdirectories, and files can be extracted from the source virtual disk file and written to the target virtual disk file. Note that the file index database only contains the metadata of files of a source VM disk; it does not contain the actual content of the files.

Figure 5:
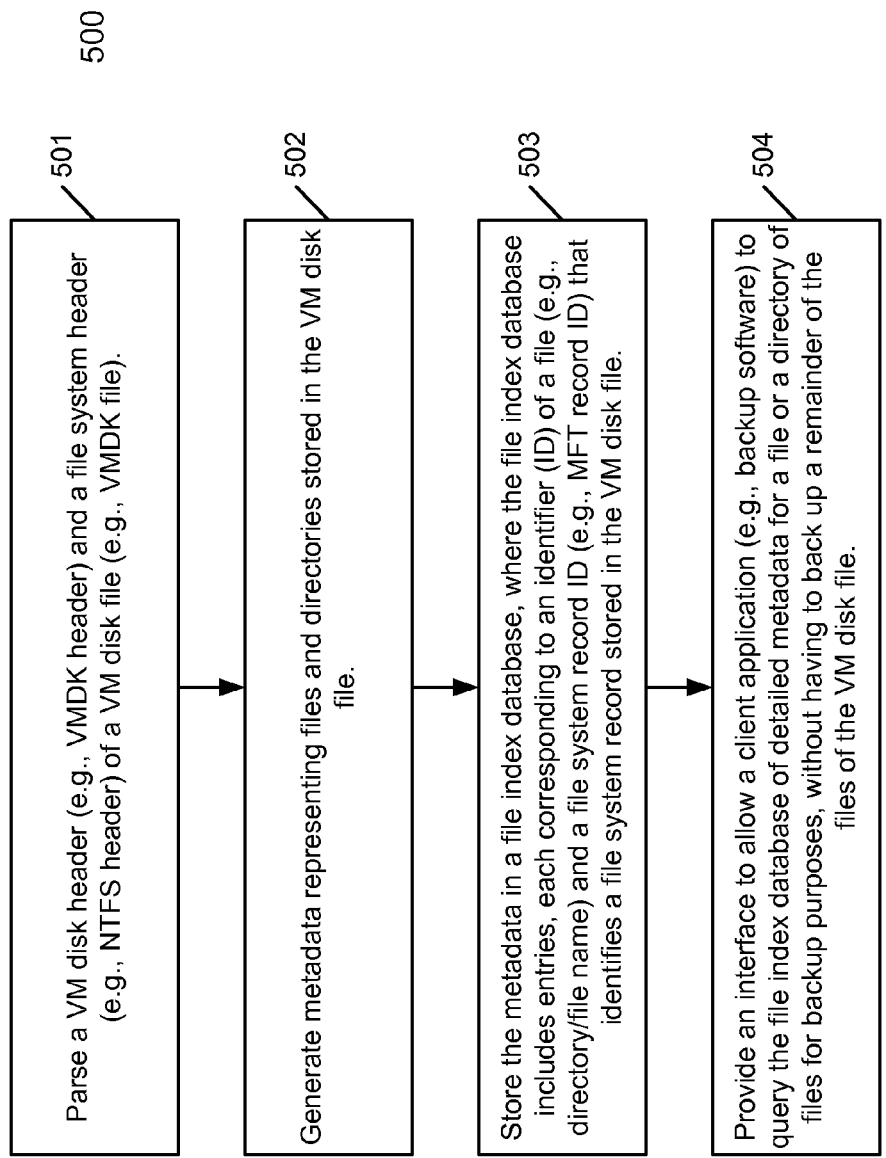
FIG. 5 is a flow diagram illustrating a method for extracting metadata and building a file index database according to one embodiment of the invention.

FIG. 5 is a flow diagram illustrating a method for extracting metadata and building a file index database according to one embodiment of the invention. Method 500 may be performed by backup engine 106 of FIG. 1. Referring to FIG. 5, at block 501, processing logic parses a virtual disk header and a file system header of a VM disk file (e.g., source VM disk). At block 502, processing logic generates metadata representing files and directories stored in the VM disk file. At block 503, the metadata is stored in a file index database. The file index database includes entries. Each entry corresponds to an identifier of a file or directory and a file system record ID that identifies a file system record stored in the VM disk file, as well as metadata (e.g., inode) associated with the file. At block 504, an interface is provided to allow a client (e.g., backup engine) to query the file index database regarding detailed metadata for a file or a directory of files for backup purpose, without having to back up the remaining files or directories of the VM disk file.

One of the complicated processes during a backup application design is to define a backup format. According to one embodiment, a virtual disk format compatible with a corresponding VM (e.g., VMDK format) is used as a backup format for a subtree backup. For example, the VMDK format is a common format utilized by the VMware virtualization applications. As VMDK is an encapsulation format for a file system, it serves as a good backup format. The blocks pertaining to the subtree/file is determined and the backup is performed. As the target VMDK file stores data blocks according to the file system (e.g., NTFS) requirements, the target VMDK file can be mounted or added as a virtual disk to any virtual machine, as long as the VM support the VMDK format.

Another complicated process involved in a subtree backup design is to determine how to define, manage, and maintain indexes (e.g., file index database 111) for the files/directories that are backed up. This is a major potential bottleneck for any backup scalability. Moreover, linking these indexes with the data poses a complex procedure. An embodiment of the invention is to store indexes and link indexes with the data. The mechanism utilizes file system record information, such as the NTFS MFT record information, as a way to store and index the information related to the files/directories that are backed up. As VMDK is an encapsulation file over the NTFS file system, both indexes and data can be stored as a single file in the same location. Since VMDK is used to store the blocks of the subtree/files, the NTFS MFT storage format can be leveraged to store the metadata corresponding to the subtree/files. As a result, there will be no need to manage indexes separately for each backup.

During the backup, according to one embodiment, the MFT table and the bitmap file of the target virtual disk file are updated with the relevant details as per the NTFS requirements. This will enable retracing the directories/files stored as part of the subtree backup. In one embodiment, the backup engine is to modify NTFS components such as bitmap file and MFT record updates for a parent directory or directories of the subtree to maintain file system consistency. This ensures that the target virtual disk file, in this example, a VMDK file, can be mounted to any VM successfully. In order to ensure proper and successful MFT parsing, the MFT records of the files/directories under the sub-tree are updated; the associated Bitmap file is updated; and the parent directory record or records for the subtree are updated.

Each file/directory is represented as a record in the MFT table. Based on the MFT record ID, a location of the corresponding MFT record can be determined. According to one embodiment, this record is populated in the target VM disk file for subsequent determination of the file/directory. The first 16 entries of the MFT table denote the state of the NTFS and contain information of the whole system. These records also need to be stored as part of the output VMDK.

A bitmap file is represented by a special MFT file record that links to a file that stores the details of the cluster allocation in the NTFS file system. Each cluster (e.g., group of 8 sectors) is represented as a bit in the bitmap file. A value of logical one in the bitmap indicates that the corresponding cluster is allocated and data is available. In one embodiment, when a sub-tree is backed up, the corresponding cluster is determined and the bit corresponding to the cluster in the bitmap will be set. This indicates the NTFS that data is present in the cluster.

In order for NTFS to identify the sub-tree correctly during MFT parsing, according to one embodiment, the appropriate links are established from a root directory such as $INDEX_ROOT to the subdirectory MFT. The $INDEX_ROOT is a special MFT record that indicates the root of the file system. Each directory MFT record contains information of all the children that are part of the directory. Hence for a subtree, MFT records of its parents have to be properly updated to reflect the corresponding child entries.

Figure 6A:
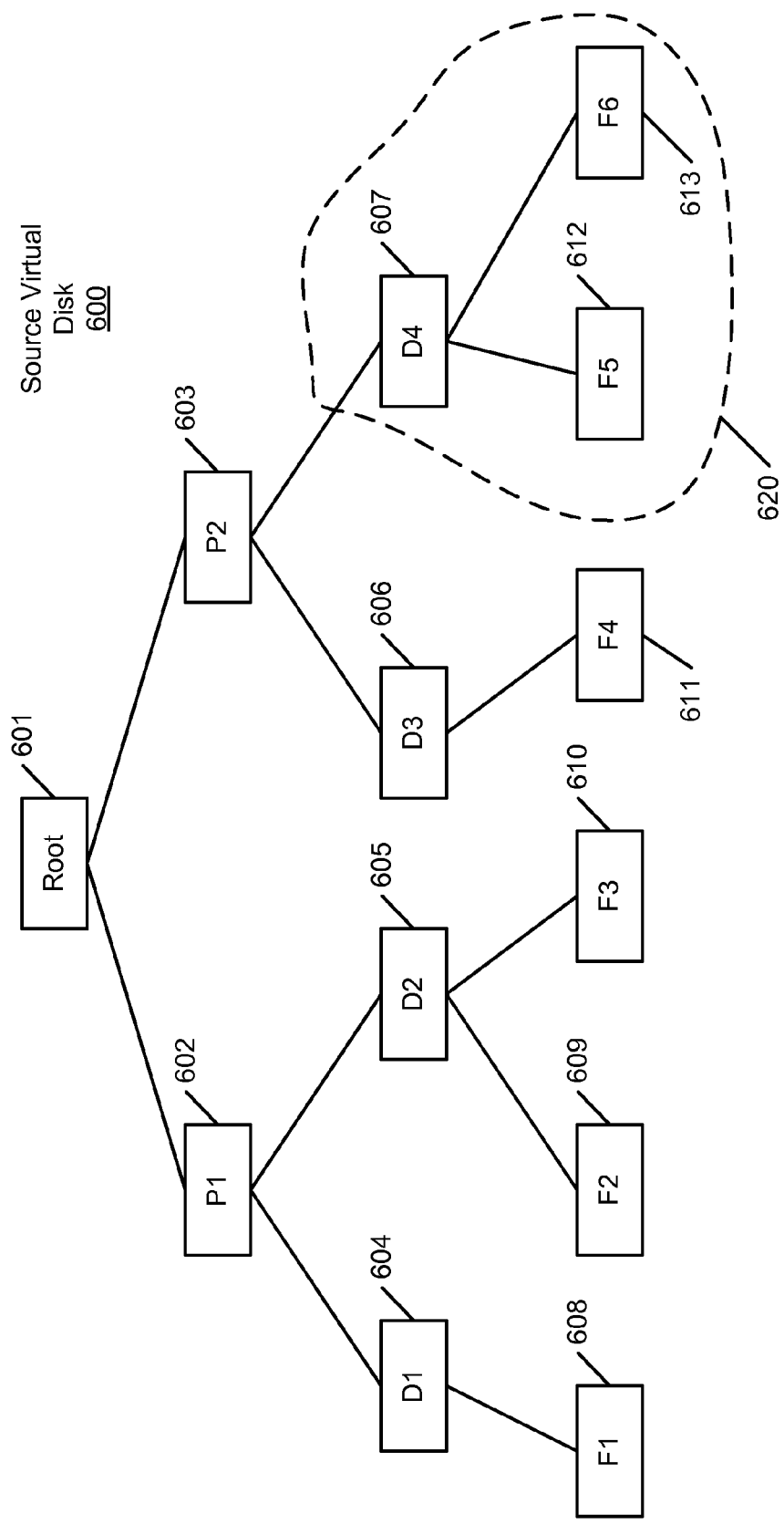
FIGS. 6A and 6B are block diagrams illustrating file system architectures according to certain embodiments of the invention.
Figure 6B:
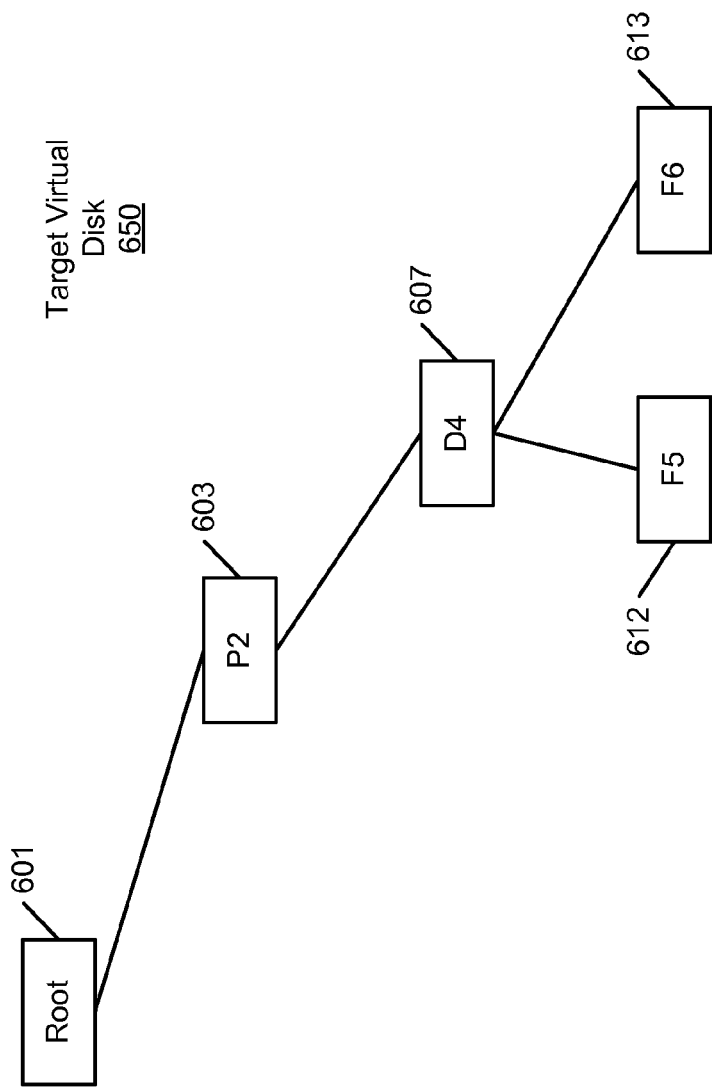

For example, as shown in FIG. 6A, source VM disk image 600 includes a hierarchical structure having a root directory 601, parent directories 602-603, subdirectories 604-607, and files 608-613 under the subdirectories. In this example, parent directory 602 includes subdirectories 604-605 and parent directory 603 includes subdirectories 606-607. According to one embodiment, a backup engine such as backup engine 106 accesses the VMM to obtain metadata representing the source VM disk image 600 including the directories and files as shown. A file index database is constructed based on the metadata. Subsequently, when a user requests to back up a subtree 620 including subdirectory 607 and its files 612-613, the backup engine is to query the file index database to identify the file system records corresponding to files 612-613 and subdirectory 607. The file system records corresponding to files 612-613 and subdirectory 607 are then backed up to a target VM disk file, without having to back up remaining files 608-611 and other subdirectories such as directories 602 and 604-606. In addition, according to one embodiment, certain header information of the source VM disk and the parent directory information (e.g., parent directory 603) may also populated in the target VM disk, as shown in FIG. 6B. As a result, target VM disk 650 of FIG. 6B can be independently loaded in any VM as a virtual disk, without other unrequested files and/or directories.

Figure 7:
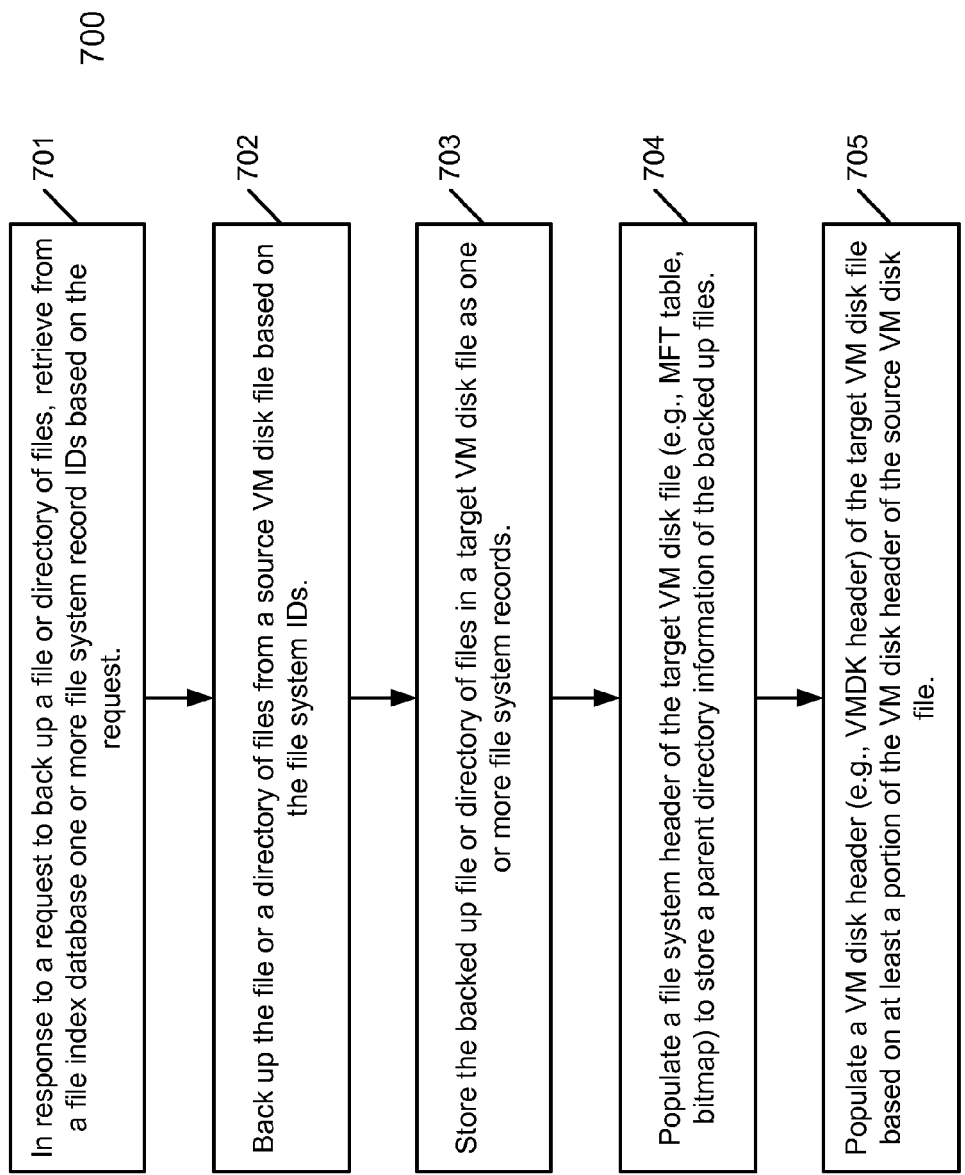
FIG. 7 is a flow diagram illustrating a method for backing up VM files according to one embodiment of the invention.

FIG. 7 is a flow diagram illustrating a method for backing up VM files according to one embodiment of the invention. Method 700 may be performed by backup engine 106 of FIG. 1. Referring to FIG. 7, at block 701, in response to a request to back up a file or a directory of one or more files, processing logic retrieves from a file index database one or more file system record IDs based on the request. The request may include a file ID or directory ID (e.g., file/directory name) and based on the file/directory ID, processing logic can identify from the file index database the corresponding file system records associated with the requested file/directory. At block 702, the file system records of the requested file/directory is then backed up from a source VM disk file and stored in a target VM disk file at block 703. In one embodiment, the backup engine transmits the file system record IDs to the VMM associated with the source VM disk and receive the corresponding file system records from the VMM. The backup engine may invoke a deduplication system to back up only the segments (e.g., data chunks) of the requested file/directory that have not been backed up during a previous backup operation. At block 704, processing logic populates a file system header of the target VM disk file (e.g., MFT table, bitmap file) to store parent directory information of the backed up file/directory. At block 705, processing logic populates a VM disk header of the target VM disk file (e.g., VMDK header) based on at least a portion of the VM disk header of the source VM disk file, such that the target VM disk file can be independently loaded in any VM as a VM disk, without having to include the remaining files/directories of the source VM disk file.

Subtree backup refers to protecting a directory with all its subdirectories and files into a virtual disk format such as a VMDK format. Identifying a directory and protecting a directory from a source VM disk is difficult, because in a conventional system, the backup agent has to be deployed inside the virtual machine to understand and protect the file system. For a virtual machine that is powered down, this would require mounting the virtual disk into a proxy server before the file system is identified. Subtree recovery refers to attempting to recover or extract a directory from a virtual disk file that was backed up. Traditionally, this refers to recovering the entire virtual disk, mounting the virtual disk as a file system into a proxy server before the specific directory can be recovered. These are complex operations that require lots of resources for either a backup or recovery to be achieved.

As a virtual disk file is a single file encapsulating the underlying file-system, it is very difficult to query/identify a particular type of files from the virtual disk file directly. For example, a user wants to backup/recover all the word documents with file extension ".docx", spreadsheet documents with file extension ".xlsx", or portable document format files with file extension ".pdf" from a backed up virtual disk file. Traditionally, for such a restricted backup, a backup agent has to be deployed in the virtual machine to perform such an operation. Recovery of only specific file types is more complex. A user can achieve this only by recovering the entire virtual disk, mount it as a file system on a proxy server, search and recover the files of requested file type. During a virtual disk backup, skipping certain files can reduce the amount of data backed up or transferred across the network. For example, pagefile.sys or snapshots need not be protected since those are irrelevant to the new virtual machine environment.

An embodiment of the invention allows a user to specify which directory or directories that need to be protected. The information about the directory or directories specified (such as file system ID and file system record information) can be queried from the file index databases created during the parsing phase as described above. Based on this information, data blocks and file system region for the files and subdirectories can be extracted from the source VM disk and written to the target VM disk.

According to one embodiment, for NTFS and VMDK as an example of a VM backup configuration, a backup engine is to determine an MFT ID and the corresponding MFT record details for the directory or directories specified by a user by querying the file index databases created during parsing stage. The backup engine is to determine the subdirectories and files from the directory index information available in the MFT record detail of the directory. For a file, the backup engine is to determine the file block information and the location of its MFT record in the source VMDK. The backup engine then writes the blocks from the source VMDK to the target VMDK at the same or similar location. For a subdirectory, the backup engine is to iterate through its index information to determine its subdirectories and files. For a directory, the backup engine is to obtain the location of its MFT record and the extents list blocks for the directory index information. The backup engine then writes those blocks from the source VMDK to target VMDK. The backup engine is to determine the MFT record for the parent directories and modify the MFT index record for the parent directory (to retain index information for only the sub-directory below it). The backup engine then modifies the bitmap file to reflect the blocks that are populated. The VMDK thus created can be used as a stand-alone virtual disk containing only the specified sub-tree and can be mounted as a normal NTFS volume.

Embodiments of the invention achieve a subtree recovery without any complex operations as required in a conventional backup system. The databases are used to determine the information regarding the directory that needs to be recovered. With this information, the file block information can be obtained and the files/directories can be recovered to any target file system. These can be used to identify and recover the directories without recovering the entire VM disk or mounting the VM disk. Embodiments of the invention provide a mechanism for determining files based on their file-type. The metadata generated and stored as part of the VMDK backup stores the file type. The file-type can be queried from the databases to directly determine the files that need to be backed up. MFT record IDs are extracted for the files along with the file-type. For a backup of specific file-types, the MFT record ID can be used to obtain the files from source VMDK and protected into the target VMDK.

During backup, there can be a requirement that certain files be skipped, for example, based on a user request or configuration. The files can be skipped based on the file-types or any other metadata. The corresponding operations are similar to determining the MFT IDs of the files to be backed up, including identifying the file blocks that correspond to these files, identifying the MFT record details of the files/directories, and skipping the files when it is written to a target file system or a target VMDK.

Embodiments of the invention as described above can achieve flexibility for VM-image level backup similar to traditional backups. The backup system has the ability to control backup and recovery based on various parameters, ability to protect only specific kind of files in VMDK format, ability to skip specific files during backup/recovery (e.g., pagefile.sys), ability to generate an output always in a VM disk format, and ability to attach the output virtual disk to any virtual machine. By utilizing a VM disk format, no new format for backup needs to be created. In this way, a subtree (in the VM disk output file) can be mounted to any VM and no more hassles of managing the metadata for subtree backup since the file system records are used to store them natively in the same VM disk file. Complexities of managing separate indexes for the sub-tree that was backed up can be reduced as these indexes are stored as file system record information in the same VM disk file. Hence these indexes need not be managed separately. Separate indexes need not be generated during backups. A user can still recover files from a backup VM disk by mounting the backup VM disk and recovering the requisite file. As indexes are already available in the databases, a user has the alternate option of recovering the files directly as well.

According to some embodiments, the techniques described above can also be applied to incremental backup. Instead of using the CBT (change block tracking) feature provided by VM vendor, in one embodiment, the backup application pre-parses a VM disk file. Based on a time attribute of the file (e.g., time attributes as shown in FIG. 8), the backup application identifies which file or files have been modified since last backup, and backup application will back up all blocks of each changed file. Such an incremental backup on a file granularity does not need to mount the VM to a proxy server and to walk the file system. It has a much better performance, and this approach does file level backup for incremental backup and thus the recovery workflow will be faster.

This approach also provides a great flexibility for users to plan their VM backup strategy. Since each VM is an active machine, the operating system continuously updates its log file, cache file, etc. It will not be necessary and desirable to keep each system stage in a backup image. By using this approach, a user can schedule a full Backup, for example, on each Sunday and an incremental backup on each weekday for user data. This approach does not use CBT and it does not back up the entire file system block during an incremental backup. When a deduplication backup system is used as the backup target, it will only store the same block once. If the backup software can turn on the client-side deduplication (e.g., invoking deduplication storage engine 107 of FIG. 1), the client will not send the duplicated blocks to same backup target. Thus, no matter if CBT has been used or not, same amount data will be transferred from a backup source to a backup target. Furthermore, according to one embodiment, the incremental backup can also be performed at a data object granularity level, where a data object or objects may be identified within a file or subdirectory that have not been backed up since the last backup operation based on the metadata. Such data objects may be identified by invoking a deduplication storage engine to identify the deduplicated data objects and only those deduplicated data objects will be backed up. For example, the corresponding file records associated with the deduplicated data objects may be identified based on the metadata and only the data blocks associated with those file records are backed up.

According to one embodiment, files can be recovered from a single backup image in either a full or incremental backup. For example, for application backup, individual data files can be large and only small part data will be changed between two backup operations. In this situation, block-based incremental backup based on the CBT is more appropriate. On another hand, if there are a lot of small files such as 1 or 2 KB in size, since the minimum size of one CBT block is 64K, the block-based incremental backup would not be appropriate since it has to back up the entire 64 k regardless how much data have been changed therein. Rather, the file-based incremental backup is more appropriate because it only needs to backup the size of the file which may be smaller than a CBT block.

For example, if a file system has a lot of small files and there are heavy access activities, the VM will generate a large CBT list since the access time of those files will be changed. Block-based incremental backup will need to backup all those changed blocks. However, since file-based incremental backup uses file time attributes, it will ignore such changes in the CBT blocks. In addition, if a new file has been created and then deleted between two backups, the block-based incremental backup will still backup all the data blocks of the deleted file which may cause an unexpected problem for a user. In this situation, resource has been wasted to backup something that may be obsolete for the user. After all, the user may not want to keep any trace of the deleted file, but since those data blocks have been save to backup image, others can recover the data from a backup image.

FIG. 9 is a flow diagram illustrating a method for incremental VM backup according to one embodiment of the invention. Method 900 may be performed by backup engine 106 of FIG. 1, which may be implemented as processing logic in software, hardware, or a combination thereof. Referring to FIG. 9, at block 901, processing logic parses a snapshot of a virtual disk of a remote system to identify and generate a file/directory index representing a file/directory hierarchy of the virtual disk. In one embodiment, a backup engine of a backup server accesses via an API a VMM of a remote system cause the VMM to obtain a snapshot of a VM disk corresponding to a VM and to parse the snapshot to extract metadata to build the file/directory index, without having to mount the VM disk in a proxy server. The file/directory index can be stored as a file/directory index database.

Subsequently, at block 902, in response to a request to back up at least a portion of data stored in the virtual disk, processing logic accesses the file/directory index to identify one or more files of the requested subdirectory. At block 903, processing logic determines based on the metadata associated with the files whether any of the identified files has been modified since the previous backup. In one embodiment, such a determination is performed based on one or more file attributes, such as the information as shown in FIG. 8 (e.g., last modified time attribute, or mtime attribute), of the file. At block 903, only those modified files are backed up from the virtual disk of the remote system, without having to back up remaining unmodified files. In one embodiment, processing logic determines the file system records corresponding to the files that have been modified and transmits the file system record IDs to the remote system to back up those files. At block 905, the backed up files are stored in a virtual disk format compatible with the VM of the remote system, such that the backed files can be loaded in a VM as a standalone virtual disk.

FIG. 10 is a block diagram illustrating a segment storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length segments based on a variety of rules or considerations. For example, the file(s) may be broken into segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, file system control 1008 processes information to indicate the segment(s) association with a file. In some embodiments, a list of fingerprints is used to indicate segment(s) associated with a file. File system control 1008 passes segment association information (e.g., representative data such as a fingerprint) to an index (not shown). The index is used to locate stored segments in storage units 1010 via storage unit interface 1012. Duplicate eliminator 206 identifies whether a newly received segment has already been stored in storage units 1010. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1010 that make up the file. Segments are then packed by a container manager (not shown) into one or more storage containers stored in storage units 1010. The deduplicated segments may be further compressed using a variation of compression algorithms, such as a Lempel-Ziv algorithm before being stored.

When a file is to be retrieved, file service interface 1002 is configured to communicate with file system control 1008 to identify appropriate segments stored in storage units 1010 via storage unit interface 1012. Storage unit interface 1012 may be implemented as part of a container manager. File system control 1008 communicates with an index (not shown) to locate appropriate segments stored in storage units via storage unit interface 1012. Appropriate segments are retrieved from the associated containers via the container manager and are used to construct the requested file. The file is provided via interface 1002 in response to the request. In one embodiment, file system control 1008 utilizes a tree (e.g., a segment tree) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
parsing, by a backup engine, a source virtual machine (VM) disk file associated with a VM to generate metadata representing a plurality of files stored in a virtual storage device of the VM, the VM being one of one or more VMs hosted by a VM monitor (VMM) of a source storage system, wherein the backup engine operates in a backup server that is communicatively coupled to the source storage system over a network, wherein the backup engine remotely accesses the source VM disk file via an application programming interface (API) of the VMM of the source storage system over the network, wherein the backup server is configured to communicate with a plurality of source storage systems over the network and to back up data from the plurality of source storage systems;
generating, by the backup engine, a file index based on the metadata representing the source VM disk file based on the parsing of the source VM disk file;
in response to a request for an incremental backup of files stored in the source VM disk file, examining based on a file attribute of each of the files from the file index to identify one or more files that have been modified within a predetermined past period of time;
determining from the file index one or more file records associated with the identified files that have been modified within the predetermined past period of time; and
transmitting, by the backup engine, to the VMM of the source storage system via the API, information representing the identified file records to back up the identified file records from the source VM disk file to a target VM disk file of a target storage system that is remote to the source storage system over the network, without having to back up unmodified files in the source VM disk file.

2. The method of claim 1, wherein the file attribute comprises a time attribute indicating when the corresponding file was modified.

3. The method of claim 1, further comprising populating a VM disk header of the target VM disk file based on the metadata, including information of at least a portion of a VM disk header of the source VM disk file, such that the target VM disk file can be mounted as a standalone VM disk that only contains the requested subdirectory of files.

4. The method of claim 1, wherein the parsing of the source VM disk file is performed without having to mount the source VM disk file as a VM disk in a proxy server.

5. The method of claim 1, further comprising:
causing the VMM to create a snapshot of the source VM disk file, wherein the parsing of the source VM disk file is performed based on the snapshot of the source VM disk file; and
causing the VMM to erase the snapshot of the source VM disk file after the parsing of the source VM disk file is completed.

6. The method of claim 1, further comprising:
storing the file index in a file index database, wherein the file index database includes a plurality of entries, each entry including a file identifier (ID) identifying a file stored in the source VM disk file and a file record ID identifying a file record of a file system associated with the source VM disk that stores the corresponding file; and
providing an interface for querying the file index database, wherein the file records of the requested subdirectory are identified by querying the file index database via the interface.

7. The method of claim 1, further comprising invoking a deduplicated segment storage engine to back up segments of each file of the source VM disk file that have not been stored in the target VM disk file.

8. A non-transitory computer-readable storage medium having instructions stored therein, which when executed by a computer, cause the computer to perform operations, the operations comprising:
parsing, by a backup engine, a source virtual machine (VM) disk file associated with a VM to generate metadata representing a plurality of files stored in a virtual storage device of the VM, the VM being one of one or more VMs hosted by a VM monitor (VMM) of a source storage system, wherein the backup engine operates in a backup server that is communicatively coupled to the source storage system over a network, wherein the backup engine remotely accesses the source VM disk file via an application programming interface (API) of the VMM of the source storage system over the network, wherein the backup server is configured to communicate with a plurality of source storage systems over the network and to back up data from the plurality of source storage systems;
generating, by the backup engine, a file index based on the metadata representing the source VM disk file based on the parsing of the source VM disk file;
in response to a request for an incremental backup of files stored in the source VM disk file, examining based on a file attribute of each of the files from the file index to identify one or more files that have been modified within a predetermined past period of time;
determining from the file index one or more file records associated with the identified files that have been modified within the predetermined past period of time; and
transmitting, by the backup engine, to the VMM of the source storage system via the API, information representing the identified file records to back up the identified file records from the source VM disk file to a target VM disk file of a target storage system that is remote to the source storage system over the network, without having to back up unmodified files in the source VM disk file.

9. The non-transitory computer-readable storage medium of claim 8, wherein the file attribute comprises a time attribute indicating when the corresponding file was modified.

10. The non-transitory computer-readable storage medium of claim 8, wherein the operations further comprise populating a VM disk header of the target VM disk file based on the metadata, including information of at least a portion of a VM disk header of the source VM disk file, such that the target VM disk file can be mounted as a standalone VM disk that only contains the requested subdirectory of files.

11. The non-transitory computer-readable storage medium of claim 8, wherein the parsing of the source VM disk file is performed without having to mount the source VM disk file as a VM disk in a proxy server.

12. The non-transitory computer-readable storage medium of claim 8, wherein the operations further comprise:
  causing the VMM to create a snapshot of the source VM disk file, wherein the parsing of the source VM disk file is performed based on the snapshot of the source VM disk file; and
  causing the VMM to erase the snapshot of the source VM disk file after the parsing of the source VM disk file is completed.

13. The non-transitory computer-readable storage medium of claim 8, wherein the operations further comprise:
  storing the file index in a file index database, wherein the file index database includes a plurality of entries, each entry including a file identifier (ID) identifying a file stored in the source VM disk file and a file record ID identifying a file record of a file system associated with the source VM disk that stores the corresponding file; and
  providing an interface for querying the file index database, wherein the file records of the requested subdirectory are identified by querying the file index database via the interface.

14. The non-transitory computer-readable storage medium of claim 8, wherein the operations further comprise invoking a deduplicated segment storage engine to back up segments of each file of the source VM disk file that have not been stored in the target VM disk file.

15. A storage system representing a backup server, comprising:
  a virtual machine (VM) disk parser to parse a source VM disk file associated with a VM to generate metadata representing a plurality of files stored in a virtual storage device of the VM, the VM being one of one or more VMs hosted by a VM monitor (VMM) of a source storage system, wherein the storage system operates as a backup server that is communicatively coupled to the source storage system over a network, wherein the VM parser remotely accesses the source VM disk file via an application programming interface (API) of the VMM of the source storage system over the network, wherein the backup server is configured to communicate with a plurality of source storage systems over the network and to back up data from the plurality of source storage systems, wherein the VM disk parser generates a file index based on the metadata representing the source VM disk file based on the parsing of the source VM disk file;
  a backup engine, in response to a request for an incremental backup of files stored in the source VM disk file, to examine based on a file attribute of each of the files from the file index to identify one or more files that have been modified within a predetermined past period of time, to determine from the file index one or more file records associated with the identified files that have been modified within the predetermined past period of time, and to transmit to the VMM of the source storage system via the API information representing the identified file records to back up identified file records from the source VM disk file to a target VM disk file of a target storage system that is remote to the source storage system over the network, without having to back up unmodified files in the source VM disk file.

16. The system of claim 15, wherein the file attribute comprises a time attribute indicating when the corresponding file was modified.

17. The system of claim 15, wherein the backup engine is to populate a VM disk header of the target VM disk file based on the metadata, including information of at least a portion of a VM disk header of the source VM disk file, such that the target VM disk file can be mounted as a standalone VM disk that only contains the requested subdirectory of files.

18. The system of claim 15, wherein the parsing of the source VM disk file is performed without having to mount the source VM disk file as a VM disk in a proxy server.

19. The system of claim 15, wherein the backup engine is to
  cause the VMM to create a snapshot of the source VM disk file, wherein the parsing of the source VM disk file is performed based on the snapshot of the source VM disk file, and
  cause the VMM to erase the snapshot of the source VM disk file after the parsing of the source VM disk file is completed.

20. The system of claim 15, further comprising a file index database to store the file index, wherein the file index database includes a plurality of entries, each entry including a file identifier (ID) identifying a file stored in the source VM disk file and a file record ID identifying a file record of a file system associated with the source VM disk that stores the corresponding file, wherein the file index database includes an interface for querying the file index database, wherein the file records of the requested subdirectory are identified by querying the file index database via the interface.

21. The system of claim 15, wherein the backup engine is to invoke a deduplicated segment storage engine to back up segments of each file of the source VM disk file that have not been stored in the target VM disk file.

* * * * *